No. 830,764. PATENTED SEPT. 11, 1906.
F. V. BRAYMER.
BREAD AND PASTRY BOARD.
APPLICATION FILED DEC. 11, 1905.

Inventor
F. V. Braymer.

Witnesses

By
R. A. B. Lacey, Attorney

UNITED STATES PATENT OFFICE.

FORREST VICTOR BRAYMER, OF BLOOMING VALLEY, PENNSYLVANIA.

BREAD AND PASTRY BOARD.

No. 830,764.      Specification of Letters Patent.      Patented Sept. 11, 1906.

Application filed December 11, 1905. Serial No. 291,315.

*To all whom it may concern:*

Be it known that I, FORREST VICTOR BRAYMER, a citizen of the United States, residing at Blooming Valley, in the county of Crawford and State of Pennsylvania, have invented certain new and useful Improvements in Bread and Pastry Boards, of which the following is a specification.

The object of my invention is to provide an improved bread and pastry board embodying sanitary and economical features and preferably constructed of one piece of sheet metal of a predetermined thickness and ornamentation and with preferably integral stiffened supporting edges, one of which is re-turned upon itself to form a receptacle for particles of flour and dough and also for a rolling-pin.

For a full description of the invention and the merits thereof and also to acquire a knowledge of the details of construction of the means for effecting the result reference is to be had to the following description and accompanying drawings, in which—

Figure 1:
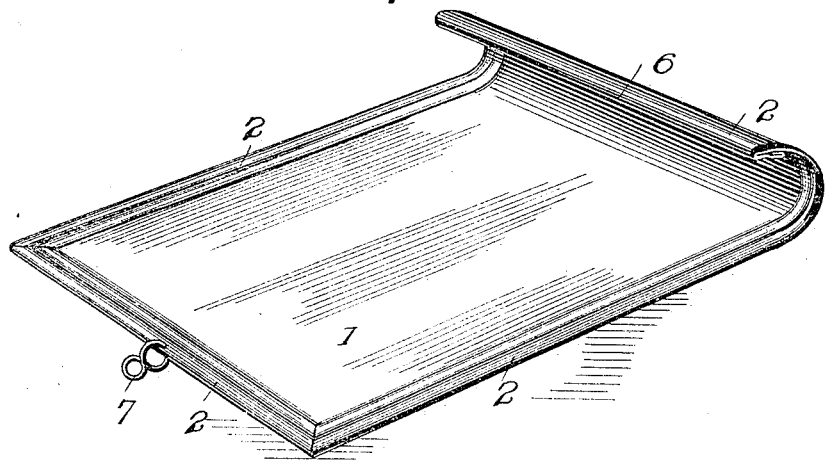
Figure 2:
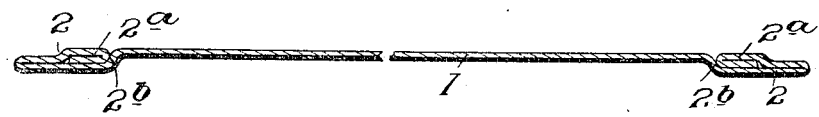
Figure 3:
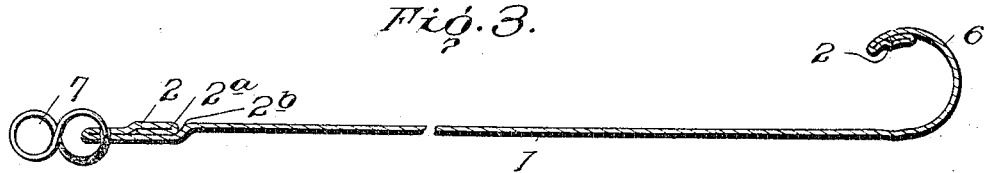
Figure 4:
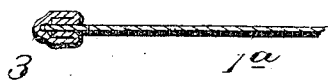
Figure 5:
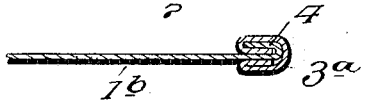
Figure 6:

Figure 1 is a perspective view of my improved bread and pastry board. Fig. 2 is a transverse sectional view thereof. Fig. 3 is a longitudinal sectional view. Figs. 4, 5, and 6 illustrate slightly-modified forms of the edges of the board.

Corresponding and like parts are referred to in the following description and indicated in all the views of the drawings by the same reference characters.

My improved bread and pastry board 1 is preferably constructed of one integral piece of sheet metal, usually tin-plate. This may be made of black plate and tinned or dipped or may be plated with any metal or be made of tin-plate and retinned or replated with other metal or otherwise, according to taste. The quality of the board, or preferably the cost of the same, is manifestly to be regulated by the coating and workmanship or ornamentation, and the weight and strength may be regulated by the grade of sheet metal.

As illustrated in Figs. 1, 2, and 3, the edges 2 of the board may be folded on all four sides in two or more laps, preferably of about one-half an inch, the said laps being pressed together to make a close joint to prevent the accumulation of dirt and to make a desirable and sufficiently stiff edge. As shown in the said figures, the stiffened and strengthened edges 2 are formed by re-turning the metal upon itself once to form a main double portion and then redoubling the smaller edge portion inwardly, as shown in cross-sectional views, and the edges are preferably so pressed together that the second re-turned portion (designated $2^a$) will fit within a slight depression $2^b$. Instead of the edges 2 being folded, as before described, they may be trimmed with a pressed or cast border-piece and the corners may be rounded and finished with a pressed or cast piece, if desired. As shown in Fig. 4, the edge 3 of the board $1^a$ is not integral therewith, but is a piece distinct therefrom and is of substantially U shape with inwardly-turned edges embracing the edges of the board proper, or, as shown in Fig. 5, one edge of the main body $1^b$ of the board may be re-turned upon itself, as shown at 4, and interlocked with one member of the substantially U-shape-pressed edge $3^a$. Again, if desired, the board proper, $1^c$, may be provided with a cast edge $3^b$, which embraces the same and is preferably secured thereon by solder or the like, (indicated at 5.) One end 6 of the board is re-turned upon itself to describe a substantial semicircle, and this tends to stiffen the board and serves at the same time as a receptacle for particles of flour or dough and also for a rolling-pin. The other end of the board is provided with an eyelet or loop 7 or the like by which the board may be hung up in some convenient place when not in use. If desired, the infinitesimal spaces between the lapped portions of the corners and edges that are closely pressed together may be filled with cement or solder, or a combination of the two, so as to leave no space for the accumulation of dirt and grease, thereby making the board easy to be cleaned.

From the foregoing description, in connection with the accompanying drawings, it will be seen that I have provided a bread and pastry board which may be cheaply made out of a piece of sheet metal and which in its integral formation will be sufficiently stiff to stand the treatment to which it will be subjected in use and which will be absolutely clean and sanitary as to produce no cracks or crevices for the accumulation of dirt and grease.

It is manifest that the board may be made of various sizes and designs.

Having thus described the invention, what is claimed as new is—

The herein-described article of manufacture consisting of a bread and pastry board composed of a single layer of sheet metal the side and both end edges of which are folded and re-turned upon themselves respectively and closely pressed together to stiffen the board and producing a suitable supporting edge, one end of the board being curled in substantially semicircular form for the purpose specified, and both faces of the single layer of metal forming the body of the board being smooth, whereby the board may be readily kept clean.

In testimony whereof I affix my signature in presence of two witnesses.

FORREST VICTOR BRAYMER. [L. S.]

Witnesses:
F. E. BRIGGS,
CAROLINE DRAKE.